United States Patent
Zhao et al.

(10) Patent No.: US 8,723,725 B2
(45) Date of Patent: May 13, 2014

(54) IONOSPHERIC DELAY COMPENSATION USING A SCALE FACTOR BASED ON AN ALTITUDE OF A RECEIVER

(75) Inventors: Hui Zhao, Olathe, KS (US); John Savoy, Olathe, KS (US)

(73) Assignee: Honeywell International Inc., Morristown, NJ (US)

( * ) Notice: Subject to any disclaimer, the term of this patent is extended or adjusted under 35 U.S.C. 154(b) by 288 days.

(21) Appl. No.: 13/303,304

(22) Filed: Nov. 23, 2011

(65) Prior Publication Data

US 2013/0127659 A1    May 23, 2013

(51) Int. Cl.
*G01S 19/40* (2010.01)
*G01S 19/07* (2010.01)

(52) U.S. Cl.
USPC ............... 342/357.23; 342/357.44

(58) Field of Classification Search
USPC ............. 342/357.23, 357.44, 357.46, 357.62; 701/470, 518
See application file for complete search history.

(56) References Cited

FOREIGN PATENT DOCUMENTS

EP        2168920        6/2002

OTHER PUBLICATIONS

Dieter Bilitza, "International Reference Ionoshpere 2000", "Radio Science", Mar. 2001, pp. 261-275, vol. 36, No. 2, Publisher: Raytheon Technical Services.

Andrew Hansen et al., "Correction Structure of Ionospheric Estimation and Correction for WAAS", "NTM", Sep. 2000, pp. 1-10, Publisher: ION.

Klobuchar, "Ionospheric Time-Delay Algorithm for Single-Frequency GPS Users", "IEEE Transactions on Aerospace and Electronic Systems", May 1987, pp. 325-331, vol. AES-23, No. 3, Publisher: IEEE.

John A. Klobuchar, "Ionoshperic Effects on GPS", "Global Positioning Systems: Theory and Applications", Apr. 1991, pp. 1-4, vol. 1.

Leung et al., "Real-Time Navigation of Formation-Flying Spacecraft Using Global-Positioning-System Measurements", "Journal of Guidance, Control, and Dynamics", Mar. 2005, pp. 226235, vol. 28, No. 5.

Oliver Montenbruck et al., "Ionospheric Correction for GPS Tracking of LEO Satellites", "the Journal of Navigation", 2002, pp. 293-304, vol. 55, Publisher: Royal Institute of Navigation.

Somieski et al, "Evaluation and Comparison of Different Methods of Ionospheric Delay Mitigation for Future Galileo Mass Market Receivers", "20th International Technical Meeting of the Satellite Division", Sep. 25, 2007, pp. 2854-2860, Publisher: ION GNSS.

European Patent Office, "Office Action", "from Foreign Counterpart of U.S. Appl. No. 13/303,304", Apr. 9, 2013, pp. 1-3, Published in: EP.

European Patent Office, "European Search Report", "from Foreign Counterpart of U.S. Appl. No. 13/303,304", Mar. 25, 2013, pp. 1-4, Published in: EP.

(Continued)

*Primary Examiner* — Dao Phan
(74) *Attorney, Agent, or Firm* — Fogg & Powers LLC

(57) ABSTRACT

In one embodiment, a method for ionospheric delay compensation is provided. The method includes determining an ionospheric delay based on a signal having propagated from the navigation satellite to a location below the ionosphere. A scale factor can be applied to the ionospheric delay, wherein the scale factor corresponds to a ratio of an ionospheric delay in the vertical direction based on an altitude of the satellite navigation system receiver. Compensation can be applied based on the ionospheric delay.

20 Claims, 3 Drawing Sheets

(56) References Cited

OTHER PUBLICATIONS

Juang et al., "A Differential GPS Correction Method for the Position Determination of a Sounding Rocket", "ION GNSS 18th International Technical Meeting of the Satellite Division", Sep. 2005, pp. 1174-1179.

Sakai et al., "Modeling Vertical Structure of Ionosphere for SBAS", "22nd International Meeting of the Satellite Division of the Institute of Navigation", Sep. 2009, pp. 1257-1267.

European Patent Office, "Communication under Rule 71(3)", "from Foreign Counterpart of U.S. Appl. No. 13/303,304", Oct. 11, 2013, pp. 1-28, Published in: EP.

IONOSPHERIC DELAY COMPENSATION USING A SCALE FACTOR BASED ON AN ALTITUDE OF A RECEIVER

STATEMENT REGARDING FEDERALLY SPONSORED RESEARCH OR DEVELOPMENT

This invention was made with Government support under NNJ06TA25C awarded by NASA. The Government has certain rights in the invention.

BACKGROUND

A satellite navigation system is a satellite based radio-navigation system in which a plurality of satellites orbit the earth and broadcast information that can be used by receivers on the earth to determine a position relative to the satellites. Example satellite navigation systems include the global positioning system (GPS), the GLONASS system, the Beidou navigation system, and the Galileo positioning system.

A satellite navigation system receiver (also referred to herein as simply "receiver") can determine a navigation solution based on pseudoranges to a plurality of navigation satellites. A pseudorange can be determined based on the time it takes for a signal to propagate from a navigation satellite to the receiver. In order to improve measurement accuracy for the propagation time of the signal, a receiver can compensate for delay experienced by a signal due to atmospheric effects. One of the delays experienced by a signal is caused by traveling through the ionosphere, and is accordingly referred to as "ionospheric delay".

Receivers that operate below the ionosphere (e.g., on the ground) can utilize Klobuchar's model to estimate the ionospheric delay. In the GPS, parameters are transmitted from GPS satellites for use by receivers in calculating the ionospheric delay according to Klobuchar's model. Accordingly, receivers can calculate the ionospheric delay according to Klobuchar's model based on the parameters transmitted by the GPS satellites. Klobuchar's model calculates ionospheric delay corresponding to a signal that propagated from a satellite to a location below the ionosphere. That is, Klobuchar's model can be used to calculate an ionospheric delay corresponding to a signal having propagated through the entire ionosphere (e.g., a receiver on the ground).

Other models exist to calculate ionospheric delay for a receiver within the ionosphere, that is, to calculate ionospheric delay for a single propagating through only a portion of the ionosphere. These models include a correction model presented by Montenbruck. The Montenbruck model can use curve fitting in order to calculate the ionospheric delay.

SUMMARY

In one embodiment, a method for ionospheric delay compensation is provided. The method includes determining an ionospheric delay based on a signal having propagated from the navigation satellite to a location below the ionosphere. A scale factor can be applied to the ionospheric delay, wherein the scale factor corresponds to a ratio of an ionospheric delay in the vertical direction based on an altitude of the satellite navigation system receiver.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
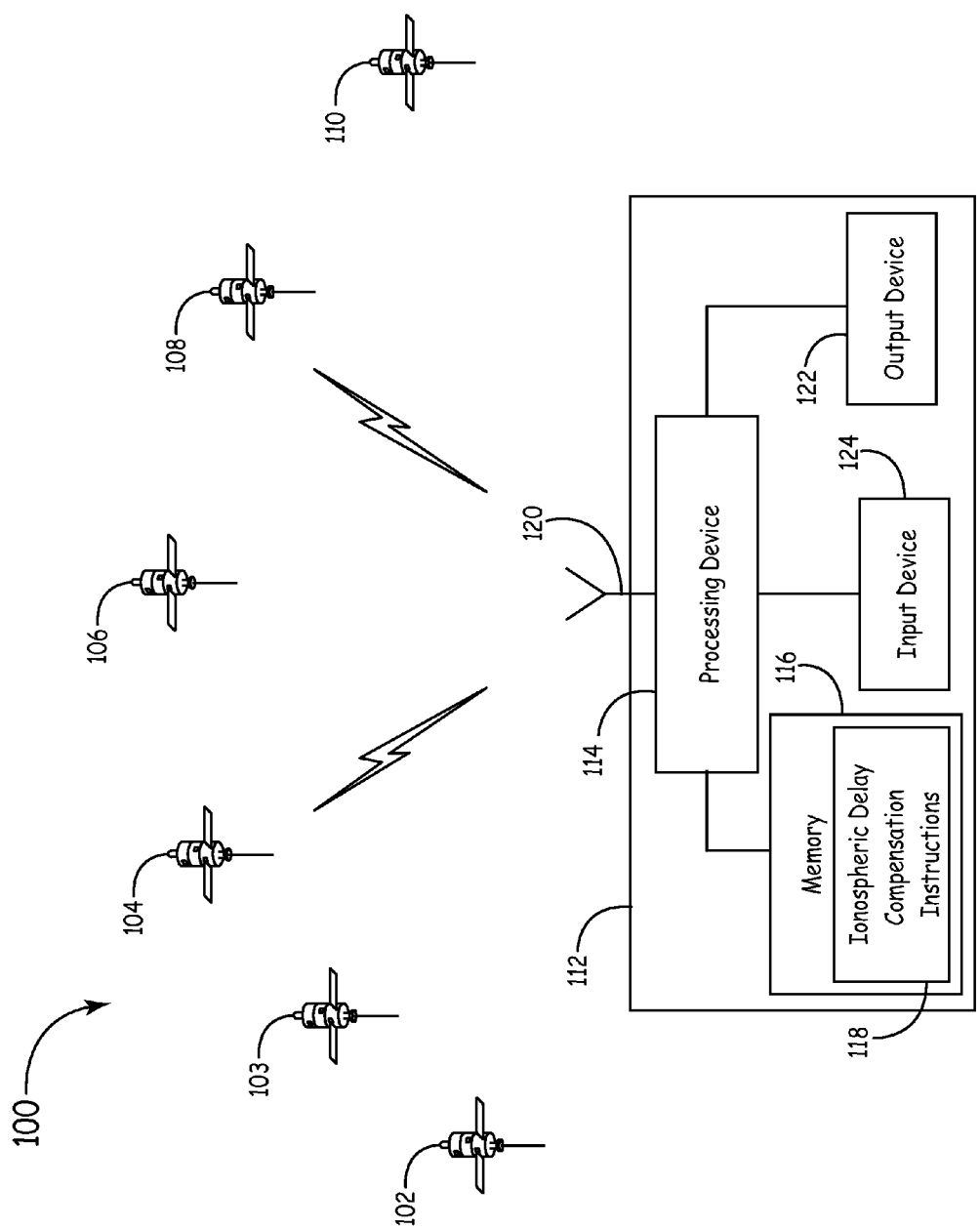
FIG. 1 is a block diagram of an example of a satellite navigation system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below can relate to single frequency ionospheric delay compensation for a satellite navigation system receiver that is within the ionosphere. These systems and methods can calculate the ionospheric delay using a scale factor based on an altitude from a receiver. In an example, a first ionospheric delay is calculated according to Klobuchar's model. The first ionospheric delay is scaled by a scale factor to account for a receiver that is within the ionosphere. The scale factor can be determined based on direct queries into the International Reference Ionosphere (IRI) database using an altitude of a receiver for reference.

FIG. 1 is a block diagram of an example of a satellite navigation system 100. The satellite navigation system 100 includes a plurality of satellites 102-110 and one or more receivers 112. As mentioned above, the satellites 102-110 can transmit signals for reception by the receiver 112. The receiver 112 can receive a signal from one or more of the satellites 102-110 and calculate a navigation solution (e.g., position and/or velocity) based on the signals. Example satellite navigation systems 100 include the global positioning system (GPS), the GLONASS system, the Beidou navigation system, and the Galileo positioning system.

The receiver 112 can include one or more processing devices 114 coupled to one or more memory devices 116. The one or more memory devices 116 can include instructions 118 which, when executed by the one or more processing devices 114, can cause the one or more processing devices 114 to perform one or more acts. As used herein, the receiver 112 is configured to perform a function when the memory 116 includes instructions 118 which, when executed by the processing device 114, cause the processing device 114 to perform the function.

In an example, the one or more processing devices 114 can include a central processing unit (CPU), microcontroller, microprocessor (e.g., a digital signal processor (DSP)), field programmable gate array (FPGA), application specific integrated circuit (ASIC), or other processing device. The one or more memory devices 116 can include any appropriate processor readable medium used for storage of processor readable instructions or data structures. Suitable processor readable media can include tangible media such as magnetic or optical media. For example, tangible media can include a conventional hard disk, compact disk (e.g., read only or rewritable), volatile or non-volatile media such as random access memory (RAM) including, but not limited to, synchronous dynamic random access memory (SDRAM), double data rate (DDR) RAM, RAMBUS dynamic RAM (RDRAM), static RAM (SRAM), etc.), read only memory (ROM), electrically erasable programmable ROM (EEPROM), and flash memory, etc. Suitable processor-readable media can also include transmission media such as electrical, electromagnetic, and digital signals, conveyed via a communication medium such as a network and/or a wireless link. Moreover, it should be understood that the processor readable media can be integrated into the receiver 112 as in, for example, RAM, or can be a separate item to which access can be provided to the receiver 112 as in, for example, portable media such as a compact disk or flash drive.

The receiver 112 can also include an antenna 120 coupled to the processing device 114 and configured to sense signals from the satellites 102-110. In an example, the receiver 112 can be configured to receive a single frequency (e.g., the f1 GPS frequency) from the satellites 102-110. In an example, the receiver 112 can include one or more output devices 122 to provide information to a user. The output device 122 can include a display, a speaker, a haptic feedback generator, a light, and other output mechanisms. In an example, the receiver 112 can be integrated into a larger device such as, for example, a spacecraft.

In an example, the receiver 112 is configured to measure the amount of time a signal takes to propagate from a satellite 102-110 to the antenna 120 and thus estimate the distance between the satellite 102-110 and the antenna 120. The receiver 112 can be further configured to calculate a navigation solution based on multiple pseudorange measurements. In an example, a navigation solution can be in earth relative coordinates (e.g., a latitude, longitude, and altitude).

Figure 2:
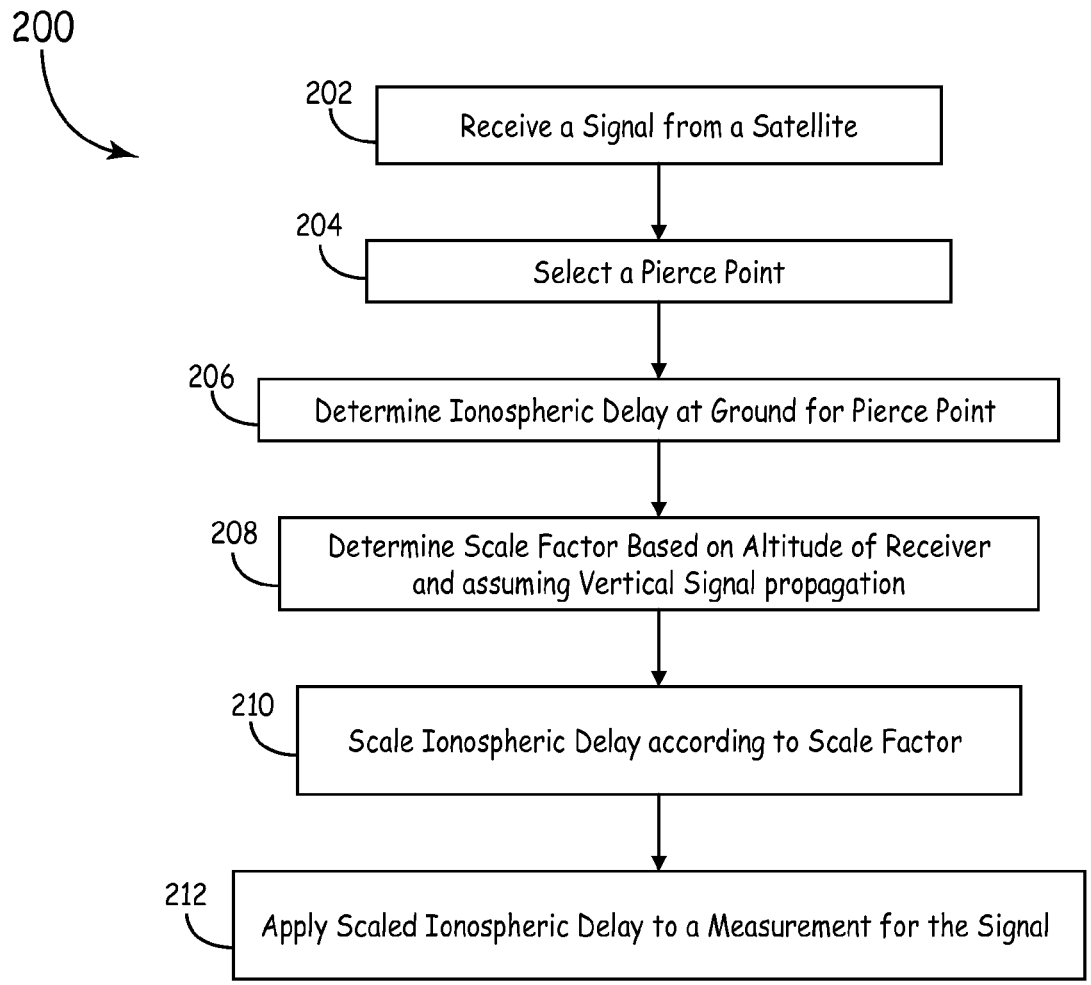
FIG. 2 is a flow diagram of an example of a method for ionospheric delay compensation using a scale factor based on an altitude of a receiver.
Figure 3:
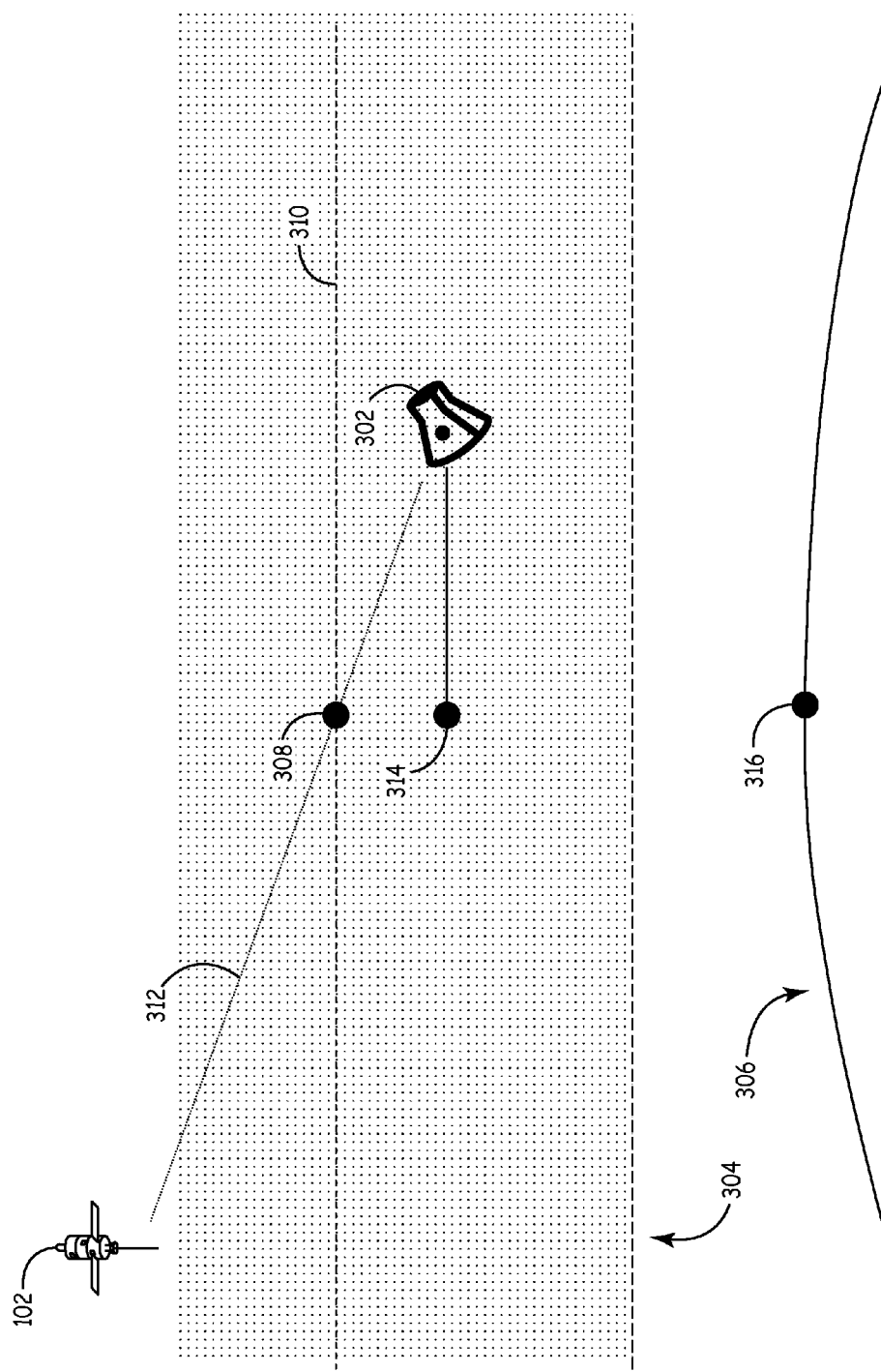
FIG. 3 is a block diagram of an example of a satellite sending a signal to a receiver within the ionosphere.

FIG. 2 is a flow diagram of a method 200 for ionospheric delay compensation using a scale factor based on an altitude of a receiver 112. In an example, the method 200 can be used for real-time single frequency ionospheric delay compensation when the receiver 112 is within the ionosphere. FIG. 3 illustrates block diagrams of examples of a satellite 102 sending a signal to a receiver 112 for use in explaining the method 200.

Method 200 includes receiving a signal from a satellite 102 at a receiver 112 (block 202 in FIG. 2). In an example, the signal received from the satellite 102 can be on a single frequency (e.g., the f1 GPS frequency). In an example, the receiver 112 can be located within a spacecraft 302 that is within the ionosphere 304 above earth 306 as shown in FIG. 3. The receiver 112 can then determine a pseudorange to the satellite 102 based on the signal. As mentioned above, to determine the pseudorange, the receiver 112 can calculate an amount of time the signal took to propagate from the satellite 102. When calculating the amount of time, the receiver 112 can compensate for delay in the signal propagation caused by the ionosphere. Accordingly, the receiver 112 can calculate an ionospheric delay for the signal. In an example, to calculate an ionospheric delay for the signal, the receiver 112 can determine a first ionospheric delay corresponding to a signal having propagated through the entire ionosphere and scale the first ionospheric delay based on the signal having only traveled through a portion of the ionosphere 304.

Accordingly, the receiver 112 can calculate a first ionospheric delay corresponding to a signal that propagated from the satellite 102 to a location below, with respect to the earth, the ionosphere 304 (block 206 of FIG. 2). That is, the receiver 112 can calculate an ionospheric delay corresponding to a signal having propagated through the entire ionosphere 304. In an example, the first ionospheric delay can be based on a calculation that takes into account a current status (e.g., updated at least daily) of the ionosphere 304. In an example, the first ionospheric delay can be calculated based on Klobuchar's model. As known, Klobuchar's model can determine the ionospheric delay for a receiver below the ionosphere 304, for example, a receiver that is on the ground. More detail regarding Klobuchar's model can be found in "Ionospheric Time-Delay Algorithm for Single-Frequency GPS Users" by John A Klobuchar, published in "IEEE Transactions on Aerospace and Electronic Systems" on May 1987, pages 325-331, Volume AES-23, Number 3, which is hereby incorporated herein by reference.

Klobuchar's model assumes that the ionosphere 304 is concentrated into a thin shell (also referred to herein as the "ionospheric shell") surrounding the earth 306. Klobuchar's model also assumes that a signal propagates through the ionospheric shell at a single point, referred to as the "pierce point". These simplifications along with coefficients provided by the satellites 102-110 enable the first ionospheric delay to be efficiently calculated based on Klobuchar's model. As known, Klobuchar's model is based on eight coefficients that are continually updated from devices on the ground based on current observations of the ionosphere 304.

In order to calculate the first ionospheric delay using Klobuchar's model, the receiver 112 can select a first location 308 to be used as the "pierce point" in Klobuchar's model (block 204 of FIG. 2). This first location 308 can be selected as a function of a path of the signal from the satellite 102 to the receiver 112. In an example, the first location 308 can be selected as a point in which a line-of-sight 312 from the satellite 102 to the receiver 112 crosses (e.g., pierces) this ionospheric shell.

Klobuchar's model includes an obliquity factor that is applied to the first ionospheric delay in order to account for a non-vertical propagation of the signal through the ionosphere 304. Accordingly, the obliquity factor can also be used to calculate the first ionospheric delay. Since the obliquity factor is based on the first location 308, selecting the first location 308 influences the obliquity factor in Klobuchar's model. In any case, the obliquity factor can be applied and the obliquity factor can be based on the first location 308.

In order to calculate the first location 308, the receiver 112 can select an altitude 310 for the ionospheric shell (also referred to herein as the "ionospheric shell altitude"). The ionospheric shell altitude 310 can be selected as an altitude within the range of altitude that the actual ionosphere 304 occupies. For example, if the ionosphere 304 occupies the altitudes from about 50 km to 1,000 km, the ionospheric shell altitude 310 can be selected as an altitude within that range.

The ionospheric shell altitude can be selected as an altitude that generally corresponds to about the $50^{th}$ percentile of the total electron content (TEC) in the portion of the ionosphere 304 above an altitude 314 of the spacecraft 302. This portion of the ionosphere 304 is also referred to herein as the "residual ionosphere". The precision of the ionospheric shell altitude 310 can be based on the amount of processing power present in the receiver 112. That is, in order to perform method 200 in a real-time system, certain inaccuracies in the ionospheric shell altitude 310 may be tolerated in the interest of reducing processing requirements.

In an example, the ionospheric shell altitude 310 (e.g., an altitude that generally corresponds to about the $50^{th}$ percentile of the total electron content (TEC)) can be selected by performing a calculation based on the altitude of the spacecraft 302. For example, the receiver 112 can calculate the $50^{th}$ percentile of TEC based on a distribution curve for the residual ionosphere. The $50^{th}$ percentile of TEC in a distribution curve can be determined based on a database of historical ionosphere data, such as the International Reference Ionosphere (IRI) database or the Global Ionosphere Maps (GIM) database. In another example, the receiver 112 can calculate an altitude that is midway between the satellite 102 and the receiver 112. For example, if the satellite is at an altitude of 20,000 km and the receiver 112 is at an altitude of 1,000 km, the ionospheric shell altitude 310 can be selected as 10,500 km.

The ionospheric shell altitude 310 (e.g., an altitude that generally corresponds to about the $50^{th}$ percentile of the total electron content (TEC)) can also be selected with minimal calculation by selecting a predefined "standard altitude". Since the standard altitude is predefined, the standard altitude does not take into account the altitude of the receiver 112. In an example, the standard altitude can be 350 km.

In some examples, the receiver 112 can use different methods to select the ionospheric shell altitude 310 (e.g., an altitude that generally corresponds to about the $50^{th}$ percentile of the total electron content (TEC)) based on the current altitude 314 of the spacecraft 302. For example, if the spacecraft 302 is near the bottom of the ionosphere 304, the predefined standard altitude can be selected as this is likely a good approximation of the $50^{th}$ percentile of TEC and requires minimal calculation. If the spacecraft 302 is higher up in the ionosphere 304 (e.g., near or above the standard altitude), the receiver 112 can use a calculation based on the altitude of the spacecraft 302 as discussed above.

In any case, the first location 308 can be selected based on the ionospheric shell altitude 310. For example, the first location 308 can be selected as the point in which a line-of-sight 312 from the satellite 102 to the receiver 112 crosses the ionospheric shell altitude 310. Once selected, the first location 308 can be used as the pierce point for a calculation according to Klobuchar's model. Accordingly, the first ionospheric delay can be calculated based on Klobuchar's model using the first location 308 as the pierce point. In other examples, other calculations can be used to determine the first ionospheric delay.

Once the first ionospheric delay is calculated, the first ionospheric delay can be scaled to account for the receiver 112 being located within the ionosphere 304, that is, to account for the signal only having traveled through a portion of the ionosphere 304. In an example, a scale factor can be determined based on the altitude of the receiver 112 (block 208). The scale factor can be determined based on the vertical ionospheric delay of the signal, because the scale factor for a signal having traveled through the ionosphere 304 at an angle (e.g., along a slant) can be considered to be equivalent to the scale factor for a signal having traveled through the ionosphere 304 in the vertical direction, due to the multiplication of the obliquity factor described above. The portion of the ionosphere 304 above the altitude 314 of the spacecraft 302 is also referred to as the residual ionosphere as described above.

In an example, the scale factor can correspond to a ratio of an ionospheric delay in the vertical direction at a second location (314 in FIG. 3) to an ionospheric delay in the vertical direction at a third location (316 in FIG. 3). The second location 314 can be vertically below the first location 308 and having an altitude corresponding to an altitude of the receiver 112 (e.g., an altitude of the spacecraft 302). As mentioned above, the ionospheric delay can be calculated with respect to a receiver below the ionosphere 304. Accordingly, the third location 316 can be vertically below the first location 308 and can correspond to an ionospheric delay below the ionosphere 304, for example, on the ground. In an example, the second location 314 and the third location 316 can be vertically below the first location 308, such that the assumed vertical signal path travels through the first 308, second 314, and third location 316. Since the ratio of the ionospheric delay for the second 314 and third location 314 is based on the ratio of the total electron content (TEC) corresponding to the second 314 and third location 316, in an example, the scale factor can be based on the ratio of a first TEC corresponding to the ionosphere 304 in a vertical column above the second location 314 to a second TEC corresponding to the ionosphere 304 in a vertical column above the third location 316. In an example, the first and second TEC can be determined based queries to a database of historical ionosphere data, such as the International Reference Ionosphere (IRI) database or the Global Ionosphere Maps (GIM) database. For example, the first TEC can be determined by a single query into the IRI database for the second location 314. Likewise, the second TEC can be determined by a single query into the IRI database for the third location 316. Accordingly, the first and second TEC can be determined by relatively quick queries into the database and without extensive calculations required by curve fitting or other algorithms. In an example, the second location 314 can have latitude and longitude coordinates corresponding to (e.g., the same as) the first location 308 and can have an altitude coordinate corresponding to (e.g., the same as) an altitude of the receiver 112. The third location 316 can have latitude and longitude coordinates corresponding to (e.g., the same as) the first location 308 and can have an altitude coordinate corresponding to an altitude below the ionosphere 304 (e.g., on the ground, zero altitude).

Once the scale factor has been determined, the first ionospheric delay can be scaled with (e.g., multiplied by) the scale factor to calculate a second ionospheric delay corresponding to an altitude of the receiver 112. For example, if the first ionospheric delay is calculated as 10 ns, and the ratio of the first TEC to the second TEC is 2 to 10, the second ionospheric delay can be 2 ns. Accordingly, an ionospheric delay can be determined in real-time from a single frequency for a receiver 112 that is within the ionosphere 304.

Once the second ionospheric delay is calculated, a compensation for the second ionospheric delay can be applied to a measurement for the signal from the satellite 102. In some examples, other compensations and adjustments can be applied to a measurement from the satellite 102, including, compensation for tropospheric delay and others.

As mentioned above, the methods and acts described herein can correspond to instructions on processor-readable media. The processor-readable media can be implemented as any available media that can be accessed by a general purpose or special purpose computer or processor, or any programmable logic device as discussed above with respect to memory 116.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for ionospheric delay compensation from a single frequency signal in a satellite navigation system receiver, the method comprising:

receiving a signal from a navigation satellite;
selecting a first location as a function of a path of the signal from the navigation satellite to the satellite navigation system receiver;
determining a first ionospheric delay based on the first location and corresponding to a signal having propagated from the navigation satellite to a location below the ionosphere;
determining a scale factor corresponding to a ratio of an ionospheric delay in the vertical direction at a second location to an ionospheric delay in the vertical direction at a third location, the second location vertically below the first location and corresponding to an altitude of the satellite navigation system receiver, the third location vertically below the first location and corresponding to an altitude below the ionosphere;
scaling the first ionospheric delay by the scale factor to determine a second ionospheric delay corresponding to the altitude of the satellite navigation system receiver; and
applying a compensation for the second ionospheric delay to a measurement for the signal from the navigation satellite.

2. The method of claim 1, wherein selecting a first location includes selecting the first location as a point in which a line-of-sight between the satellite navigation system receiver and the navigation satellite crosses a shell corresponding to an altitude at which the ionosphere is assumed to be concentrated.

3. The method of claim 2, comprising:
selecting the altitude at which the ionosphere is assumed to be concentrated based on the $50^{th}$ percentile of the total electron content (TEC) in the portion of the ionosphere above the satellite navigation system receiver.

4. The method of claim 1, wherein determining a scale factor includes:
determining a first total electron content (TEC) of the ionosphere, the first TEC corresponding to the ionosphere in a vertical column above the second location;
determining a second TEC of the ionosphere, the second TEC corresponding to the ionosphere in a vertical column above the third location; and
wherein the scale factor corresponds to the ratio of the first TEC to the second TEC.

5. The method of claim 4, wherein the determining a first TEC includes querying a database of historical ionosphere data; and wherein determining a second TEC includes querying the database of historical ionosphere data.

6. The method of claim 5, wherein the determining a first TEC includes a single query into the database of historical ionosphere data; and wherein determining a second TEC includes a single query into the database of historical ionosphere data.

7. The method of claim 6, wherein the database includes an International Reference Ionosphere (IRI) database or a Global Ionosphere Maps (GIM) database.

8. The method of claim 1, wherein determining a first ionospheric delay includes calculating ionospheric delay according to Klobuchar's model and using the first location as a pierce point.

9. The method of claim 1, wherein determining a first ionospheric delay includes:
applying an obliquity factor to account for a non-vertical propagation of the signal through the ionosphere.

10. A satellite navigation system receiver comprising:
one or more processing devices;
one or more memory devices coupled to the one or more processing devices and including instructions which, when executed by the one or more processing devices, cause the one or more processing devices to:
receive a signal from a navigation satellite;
select a first location as a function of a path of the signal from the navigation satellite to the satellite navigation system receiver;
determine a first ionospheric delay based on the first location and corresponding to a signal having propagated from the navigation satellite to a location below the ionosphere;
determine a scale factor corresponding to a ratio of an ionospheric delay in the vertical direction at a second location to an ionospheric delay in the vertical direction at a third location, the second location vertically below the first location and having an altitude corresponding to an altitude of the satellite navigation system receiver, the third location vertically below the first location and having an altitude below the ionosphere;
scale the first ionospheric delay by the scale factor to determine a second ionospheric delay corresponding to the altitude of the satellite navigation system receiver; and
apply a compensation for the second ionospheric delay to a measurement for the signal from the navigation satellite.

11. The satellite navigation system receiver of claim 10, wherein select a first location includes select the first location as a point in which a line of sight between the satellite navigation system receiver and the navigation satellite crosses a shell corresponding to an altitude at which the ionosphere is assumed to be concentrated.

12. The satellite navigation system receiver of claim 11, wherein the instructions cause the one or more memory devices to:
select the altitude at which the ionosphere is assumed to be concentrated based on the $50^{th}$ percentile of the total electron content (TEC) in the portion of the ionosphere above the satellite navigation system receiver.

13. The satellite navigation system receiver of claim 10, wherein determine a scale factor includes:
determine a first total electron content (TEC) of the ionosphere, the first TEC corresponding to the ionosphere in a vertical column above the second location;
determine a second TEC of the ionosphere, the second TEC corresponding to the ionosphere in a vertical column above the third location; and
wherein the scale factor corresponds to the ratio of the first TEC to the second TEC.

14. The satellite navigation system receiver of claim 13, wherein determine a first TEC includes querying a database of historical ionosphere data; and wherein determine a second TEC includes querying the database of historical ionosphere data.

15. The satellite navigation system receiver of claim 14, wherein determine a first TEC includes a single query into the database of historical ionosphere data; and wherein determine a second TEC includes a single query into the database of historical ionosphere data.

16. The satellite navigation system receiver of claim 15, wherein the database includes an International Reference Ionosphere (IRI) database or a Global Ionosphere Maps (GIM) database.

17. The satellite navigation system receiver of claim 10, wherein determine a first ionospheric delay includes calculate ionospheric delay according to Klobuchar's model and using the first location as a pierce point.

18. The satellite navigation system receiver of claim 10, wherein determine a first ionospheric delay includes:
   apply an obliquity factor to account for a non-vertical propagation of the signal through the ionosphere.

19. A non-transitory computer readable medium including instructions which, when executed by a processing device, cause the processing device to:
   select a first location as a function of a path of a signal from a navigation satellite to a satellite navigation system receiver;
   determine a first ionospheric delay according to Klobuchar's model, using the first location as a pierce point;
   query an International Reference Ionosphere (IRI) database to determine a first total electron content (TEC) of the ionosphere, the first TEC corresponding to the ionosphere in a vertical column above a second location vertically below the first location and having an altitude of the satellite navigation system receiver;
   query the IRI database to determine a second TEC of the ionosphere, the second TEC corresponding to the ionosphere in a vertical column above a third location vertically below the first location and below the ionosphere;
   determine a second ionospheric delay by:
      scaling the first ionospheric delay by an amount corresponding to the first TEC over the second TEC to determine a second ionospheric delay corresponding to the altitude of the satellite navigation system receiver; and
   apply a compensation for the second ionospheric delay to a measurement for a signal from the navigation satellite.

20. The non-transitory computer readable medium of claim 19, wherein select a first location includes select the first location as a point in which a line of sight between the satellite navigation system receiver and the navigation satellite crosses a shell corresponding to an altitude at which the ionosphere is assumed to be concentrated.

\* \* \* \* \*